(12) United States Patent
Choi et al.

(10) Patent No.: US 7,440,063 B2
(45) Date of Patent: Oct. 21, 2008

(54) FABRICATION METHOD OF FRINGE FIELD SWITCHING MODE LIQUID CRYSTAL DISPLAY DEVICE

(75) Inventors: Seung Chan Choi, Gyeongsan-si (KR); Hyun Kyu Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 302 days.

(21) Appl. No.: 11/454,854

(22) Filed: Jun. 19, 2006

(65) Prior Publication Data
US 2006/0290865 A1      Dec. 28, 2006

(30) Foreign Application Priority Data
Jun. 24, 2005     (KR) ...................... 10-2005-0054916

(51) Int. Cl.
*G02F 1/1343*     (2006.01)
(52) U.S. Cl. ...................... 349/141; 349/142
(58) Field of Classification Search .......... 349/141–142
See application file for complete search history.

(56) References Cited

U.S. PATENT DOCUMENTS 7,280,176 B2 * 10/2007 Yuh et al. .................. 349/141

2005/0128401 A1 * 6/2005 Lee ............................ 349/139
2006/0146256 A1 * 7/2006 Ahn ........................... 349/141
2006/0285050 A1 * 12/2006 Yoo et al. ................... 349/141

* cited by examiner

*Primary Examiner*—David C. Nelms
*Assistant Examiner*—Phu Vu
(74) *Attorney, Agent, or Firm*—McKenna Long & Aldridge LLP

(57) ABSTRACT

A method of fabricating an FFS LCD is provided. The fabrication method comprises: forming a common electrode and gate metal on a board and etching them through a first mask process; forming a gate insulating layer, active layer and source/drain metal on the board; forming a channel in a TFT part, removing the gate metal in the pixel area part and opening a gate pad part; forming a passivation layer substantially on the board, and forming a contact hole on the TFT part, removing the active layer remaining from the pixel area part and exposing a gate pad part and a data pad part by a third mask process; and forming a pixel electrode substantially on the board, and forming a pixel electrode on regions contacting the drain electrode in the TFT part, having the opening in pixel area part and opened regions of the gate pad and data pad part through a fourth mask process.

12 Claims, 21 Drawing Sheets

Vcom(ITO)

Gate

Active

S/D

Passi

Pixel

FABRICATION METHOD OF FRINGE FIELD SWITCHING MODE LIQUID CRYSTAL DISPLAY DEVICE

This application claims the benefit of Korean Patent Application No. 10-2005-0054916, filed on Jun. 24, 2005, which is hereby incorporated by reference for all purposes as if fully set forth herein.

BACKGROUND OF THE INVENTION

1. Field of the Invention

The present invention relates to a fringe field switching (FFS) mode liquid crystal display device (LCD), and a method of manufacturing a fringe field switching (FFS) mode LCD that reduces the number of mask processes using a diffraction exposure.

2. Discussion of the Related Art

Many researches are actively developing a light and slim display device having a large-size screen, low power consumption, and of low cost. Liquid crystal display devices (LCDs) are favored as display devices that satisfy such requirements.

LCDs provide a higher resolution than other flat panel display devices and have rapid response characteristics resulting in high quality images similar to a cathode-ray tube (CRT) when reproducing a moving picture.

An LCD may include a color filter substrate having a common electrode, an array substrate having a pixel electrode and liquid crystal filling a gap between the color filter and array substrates. A twisted nematic (TN) mode LCD may be used in active matrix LCDs. The TN mode LCD includes two substrates each having an electrode and a liquid crystal director twisted at 90 degrees. The TN mode LCD twists the liquid crystal director in part by supplying voltage to the electrodes.

However, the TN mode LCD is disadvantageous because of its narrow viewing angle.

In order to overcome such a disadvantage with the TN mode LCD, many researches are developing a new mode of LCD. Recently, an In-Plane Switching mode LCD and a Fringe Field Switching (FFS) mode LCD have been developed.

Particularly, the FFS mode LCD display device provides a wide viewing angle with high permeability characteristics which differs from the In-Plane Switching mode LCD.

In an FFS mode LCD, a fringe field is formed above a transparent common electrode and a transparent pixel electrode by arranging the distance between the common electrode and the pixel electrode shorter than a distance between a top and bottom substrate so that the liquid crystal molecules are driven above the electrodes.

FIG. 1A is a plan view of a unit pixel of an FFS mode LCD according to the related art, and FIG. 1B is a cross-sectional view of FIG. 1A taken along a line I-I'.

As shown in FIGS. 1A and 1B, a unit pixel is defined by crossing gate lines 2 and data lines 4 on a bottom substrate and a thin film transistor (TFT) is disposed at a crossing of the gate line 2 and the data line 4.

A common electrode 5 may be made of a transparent conductive material. The common electrode 5 is substantially formed at each unit pixel and may have a substantially rectangular shape. The common electrode 5 is connected to a common signal line 7 to constantly receive a common signal.

Also, a pixel electrode 8 is formed at the unit pixel to be overlapped with the common electrode 5 and an insulating layer (not shown) may be interposed between the overlapped electrodes.

The pixel electrode 8 may be substantially formed in a plate shape and may include a plurality of slits 8a to expose a predetermined portion of the common electrode 5.

Although not shown in the drawings, the top and bottom substrates face one another and are separated at a distance greater than a distance between the pixel electrode 8 and the common electrode 5. Liquid crystal is filled between the top and bottom substrates.

Recently, a new electrode structure that prevents color shift by forming a predetermined pattern at a transparent electrode layer of an FFS mode LCD has been introduced.

That is, a dual domain is formed on a unit pixel as shown in FIG. 1A. The dual domain is formed by diagonally forming two groups of a plurality of slits 8a with a uniform gap, where one group of the slits is symmetric with the other group of the slits.

FIGS. 2A through 2F are plan views for describing a method of fabricating an FFS mode LCD according to the related art.

As shown in FIG. 2A, a substantially rectangular plate-shaped common electrode is formed on a board (not enumerated) through a first mask process. Then, a second mask process is performed to form the gate line and the common line as shown in FIG. 2B.

After forming the gate line and the common line, a third mask process is performed to form an active region as shown in FIG. 2C and a fourth mask process is performed to form the data line, a source electrode and a drain electrode as shown in FIG. 2D. Then, a fifth mask process is performed to form a contact hole as shown in FIG. 2E and a sixth mask process is performed to form a pixel electrode as shown in FIG. 2F. That is, the FFS mode LCD is fabricated through six mask processes as shown in FIGS. 2A through 2F.

Since numerous masks are required to fabricate the FFS mode LCD according to the related art, fabricating time and cost booth increase.

In order to overcome the disadvantages of the related art fabrication method, a diffraction exposure was introduced. The diffraction exposure allows a common electrode, a gate line and a common signal line to be formed through one mask process. However, it is very difficult to maintain exposure uniformity and photo-resist ashing uniformity on diffraction-exposed regions because diffraction-exposed regions of the gate metal and the common electrode face one another.

SUMMARY OF THE INVENTION

Accordingly, the present invention is directed to a fabrication method of fringe field switching mode liquid crystal display device that substantially obviates one or more of the problems due to limitations and disadvantages of the related art.

An advantage of the present invention is to provide a method of fabricating a fringe field switching mode liquid crystal display device for reducing the number of mask processes by selectively removing a gate metal, an active layer and a source/drain region through openings using a diffraction exposure while forming a source electrode and a drain electrode.

Additional features and advantages of the invention will be set forth in the description which follows, and in part will be apparent from the description or may be learned from practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, there is provided a method of fabricating a fringe field switching mode liquid crystal display device comprising: forming a common electrode and a gate metal on a board in sequence; etching the common electrode and the gate metal at the same time through a first mask process; forming a gate insulating layer, an active layer and a source/drain metal on the board in sequence; forming a channel in a thin-film transistor (TFT) part, removing a gate metal at an opening of the pixel area part and opening a gate pad part; forming a passivation layer substantially on the entire surface of the board, and forming a contact hole on a drain electrode of the TFT part, removing an active layer remaining substantially at the center of the pixel area part and exposing a gate pad part and a data pad part by performing a third mask process; and forming a pixel electrode substantially on the entire surface of the board, and forming a pixel electrode on a predetermined region contacting the drain electrode in the TFT part, a predetermined region having the opening in the pixel area part and openings of the gate pad part and the data pad part through a fourth mask process.

In another aspect of the present invention, there is provided a method of fabricating a fringe field switching (FFS) mode liquid crystal display device, the method comprising: forming a common electrode, a gate metal and a gate insulating layer on a board in sequence; etching the common electrode, the gate metal and the gate insulating layer through a first mask process; forming an active layer and a source/drain metal on the board in sequence; forming a channel in a thin-film transistor (TFT) part, removing a gate metal at an opening of the pixel area part, and opening a gate pad part; forming a passivation layer substantially on the board, forming a contact hole on a drain electrode of the TFT part, removing an active layer remaining at the center of the pixel area part and opening a gate pad part and a data pad part by performing a third mask process; and forming a pixel electrode substantially on the entire surface of the board, and forming a pixel electrode at a predetermined region of the TFT part that contacts a drain electrode of the TFT part, a predetermined region of the pixel area part having an opening of the pixel area part and openings of the gate pad part and the data pad part by performing a fourth mask process.

In still another aspect of the present invention, there is provided a method of fabricating a fringe field switching (FFS) mode liquid crystal display device, the method comprising: forming a common electrode, a gate metal and a first insulating layer on a board in sequence; etching the common electrode, the gate metal and the gate insulating layer through a first mask process; forming a second gate insulting layer, an active layer and a source/drain metal on the board in sequence; forming a channel in a thin-film transistor (TFT) part, removing a gate metal at an opening of the pixel area part, and opening a gate pad part; forming a passivation layer substantially on the board, forming a contact hole on a drain electrode of the TFT part, removing an active layer remaining substantially at the center of the pixel area part and opening a gate pad part and a data pad part by performing a third mask process; and forming a pixel electrode substantially on the entire surface of the board, and forming a pixel electrode at a predetermined region of the TFT part that contacts a drain electrode of the TFT part, a predetermined region of the pixel area part having an opening of the pixel area part and opened regions of the gate pad part and the data pad part by performing a fourth mask process.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to an embodiment of the present invention, examples of which are illustrated in the accompanying drawings. Wherever possible, the same reference numbers will be used throughout the drawings to refer to the same or like parts.

FIGS. 3A through 3D are cross-sectional views for describing a method of fabricating an FFS mode LCD according to an embodiment of the present invention, and FIGS. 4A through 4D show mask patterns used for the mask processes illustrated in FIGS. 3A through 3D.

Figure 1A:
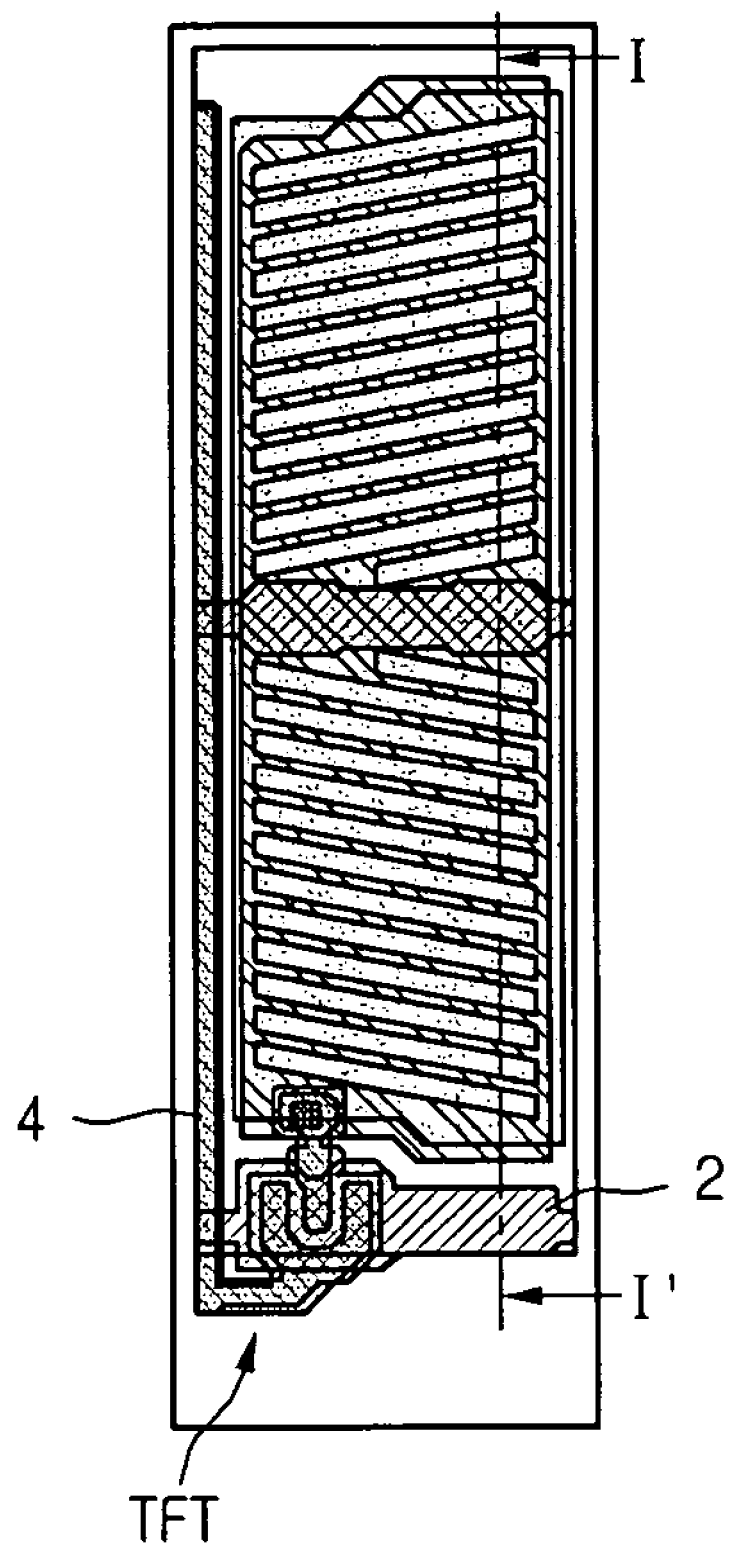
FIGS. 1A and 1B are a plan view of a unit pixel of an FFS mode LCD and a cross sectional view of the unit pixel taken along a line I-I' according to the related art.
Figure 1B:
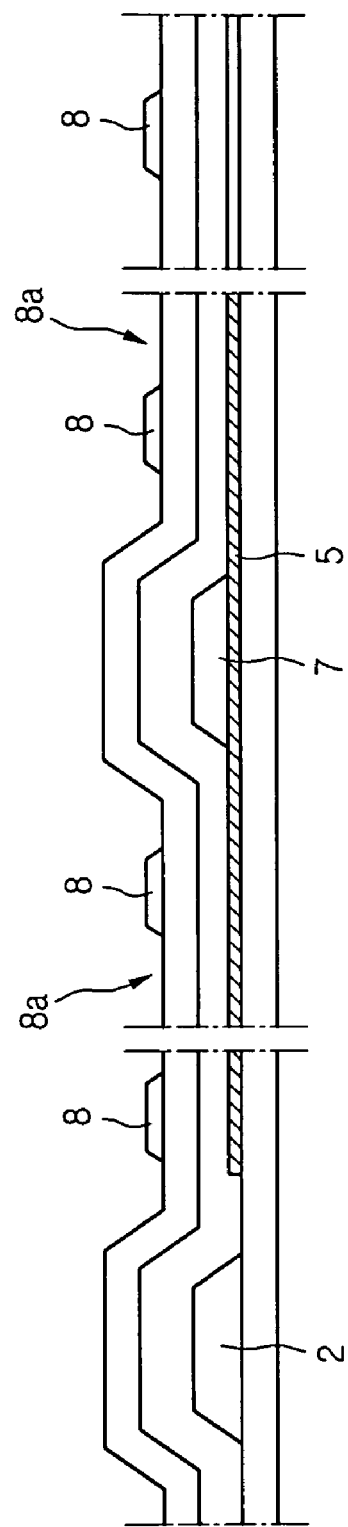
Figure 2A:
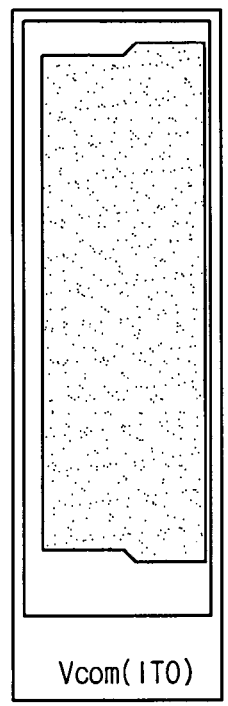
FIGS. 2A through 2F are plan views for describing a method of fabricating the FFS mode LCD of FIGS. 1A and 1B according to the related art.
Figure 2B:
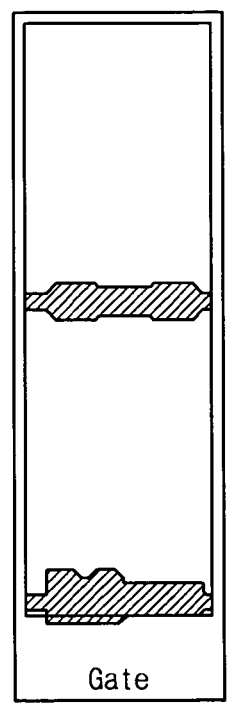
Figure 2C:
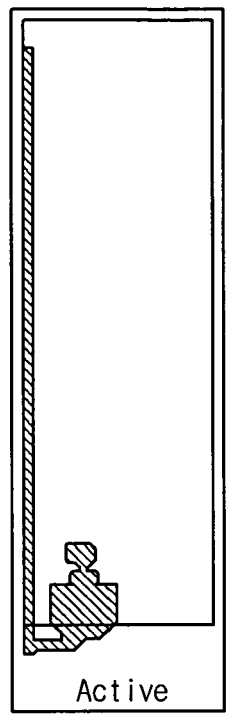
Figure 2D:
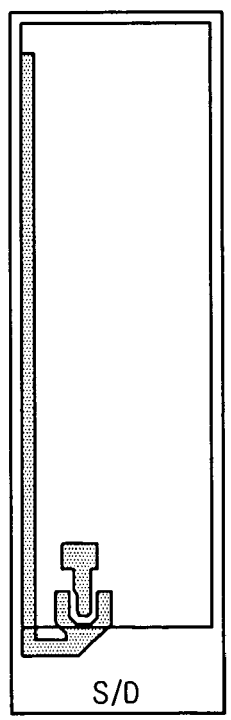
Figure 2E:
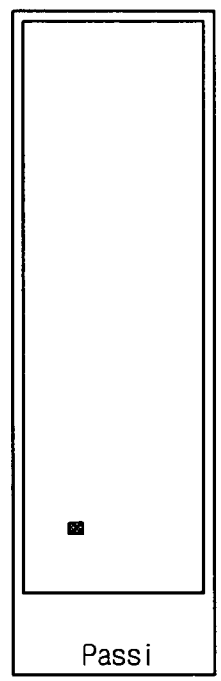
Figure 2F:
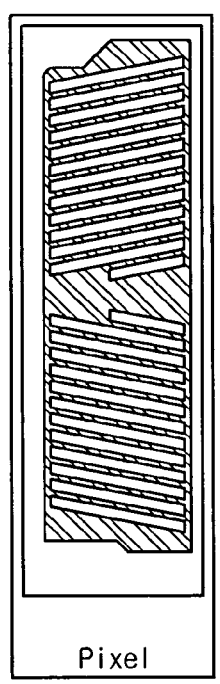
Figure 3A:
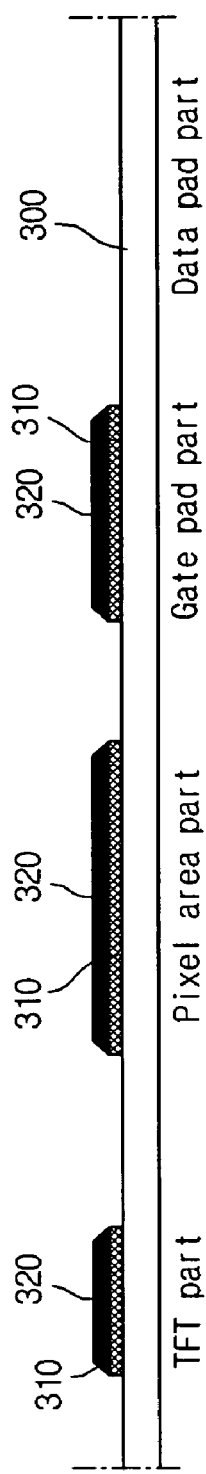
FIGS. 3A through 3D are cross-sectional views for describing a method of fabricating an FFS mode LCD according to an embodiment of the present invention.
Figure 4A:
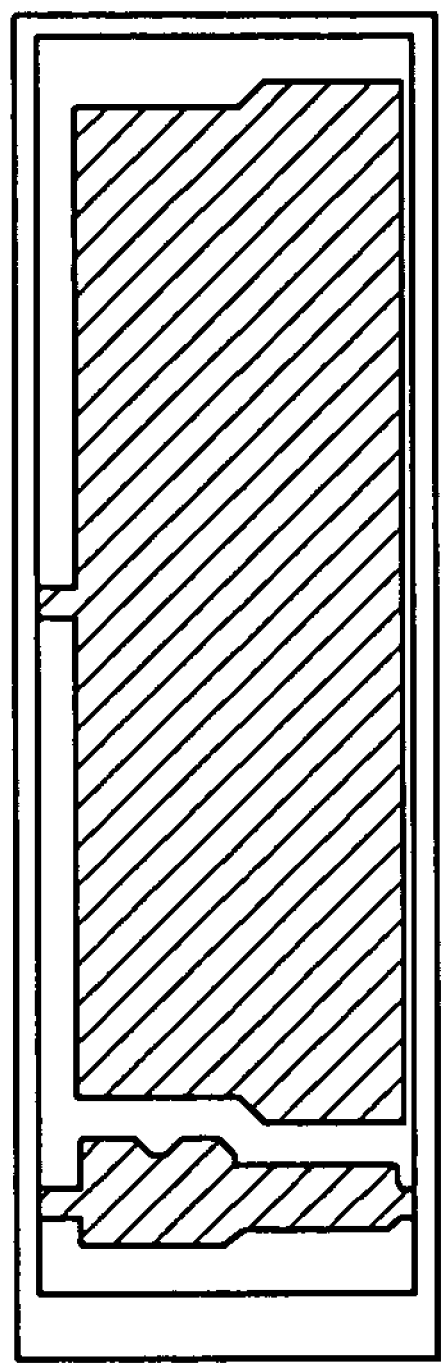
FIGS. 4A through 4D show mask patterns used for the mask processes illustrated in FIGS. 3A through 3D.
Figure 4B:
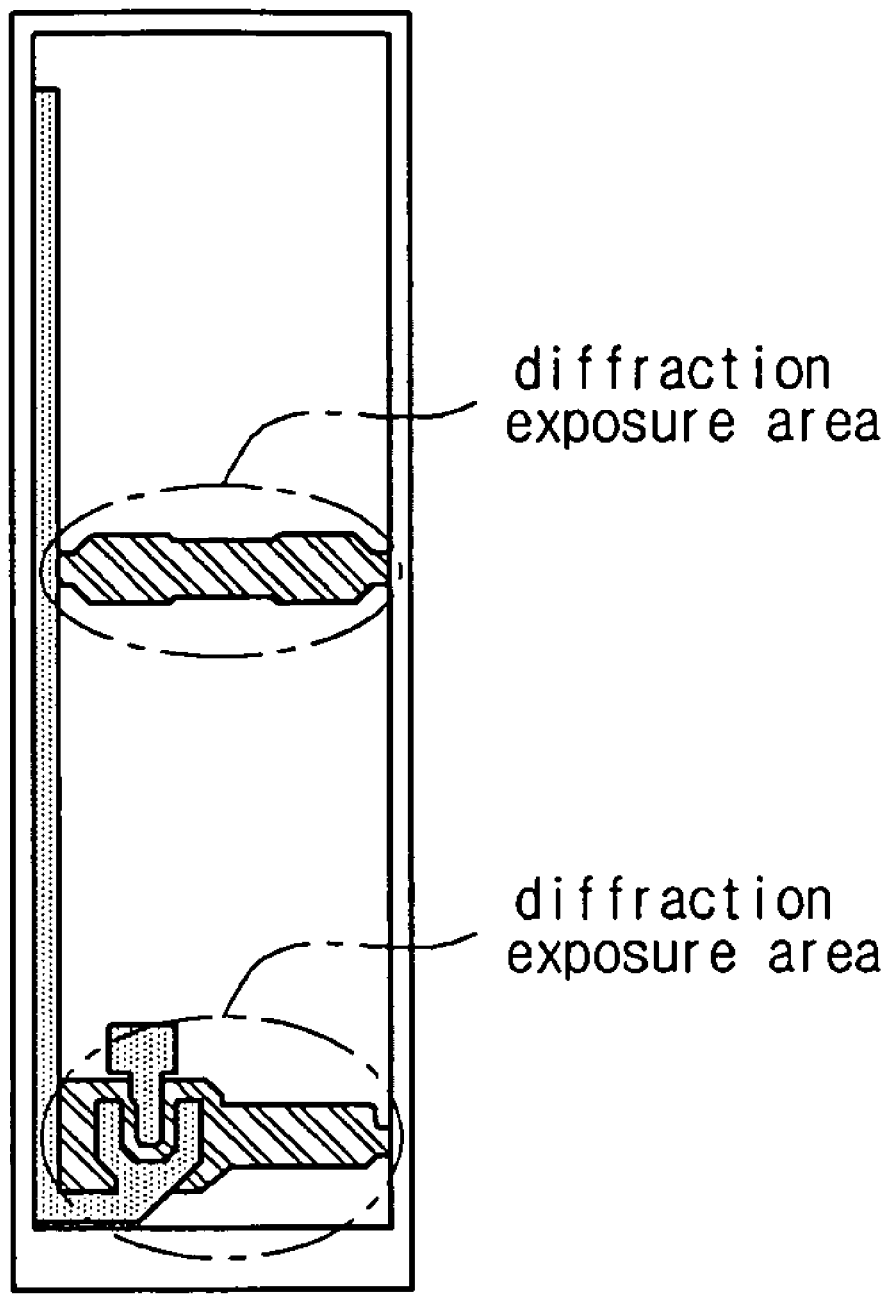

As shown in FIG. 3A, a common electrode 310 and a gate metal 320 are sequentially deposited on a board (or substrate) 300. Then, the common electrode 310 and the gate metal 320 are simultaneously etched through a photolithography process using a first mask having a pattern as shown in FIG. 4A.

As a result, the common electrode 310 and the gate metal 320 are substantially stacked on a TFT part, a pixel area part and a gate pad part as shown in FIG. 3A.

The gate metal 320 formed on the TFT part operates as a gate line and a gate electrode, the gate metal 320 formed on the pixel area part operates as a common signal line, and the gate metal 320 formed on the gate pad part operates as a bottom electrode of a gate pad.

The common electrode 310 may be formed of a transparent material such as ITO and formed in a substantially rectangular shape in the pixel area part.

Figure 3B:
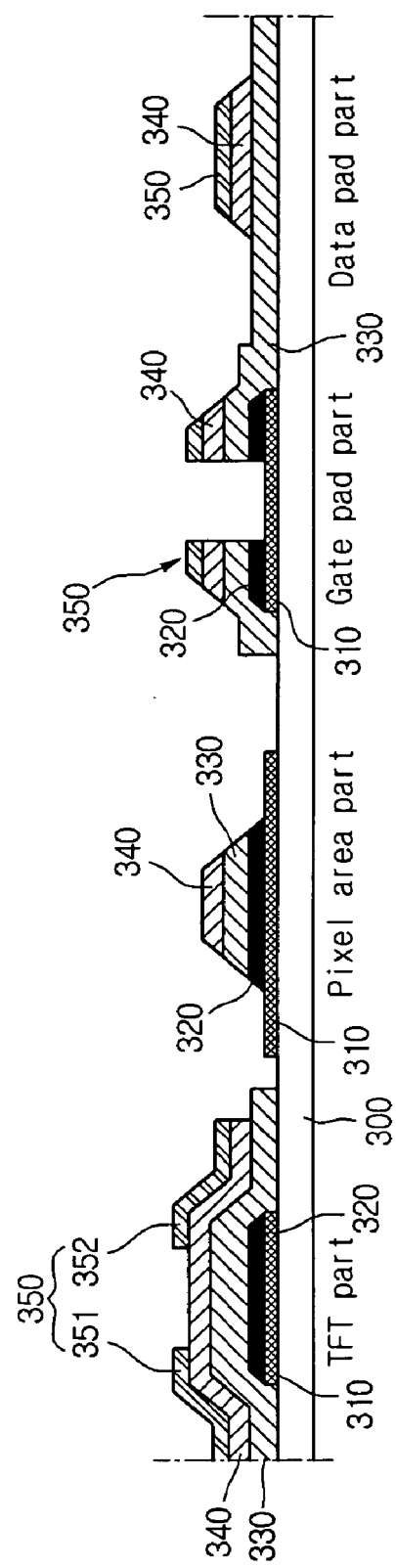

As shown in FIG. 3B, a gate insulating layer 330, an active layer 340 and a source/drain metal 350 are sequentially deposited on the board 300. Then, a channel is formed on the TFT part, a gate metal is removed from an opened region of the pixel area part and a gate pad is opened through a photolithography process using a second mask as shown in FIG. 4A.

Also, a gate insulating layer 330, an active layer 340 and a source/drain metal 350 are sequentially stacked on the data pad part.

A diffraction exposure process is performed in the second mask process according to the present embodiment. The fabrication method according to the embodiment of the present invention may be characterized by performing the diffraction exposure process on a channel forming area in the TFT part and a common signal line forming area in the pixel area part.

As shown in FIG. 3B, the diffraction exposure process exposes the active layer 340 and separates a source electrode 351 and a drain electrode 352 in the TFT part to form the channel in the TFT part. Also, the gate metal 320 substantially formed on the center portion of the pixel area part is not etched so the remaining gate metal 320 operates as a common signal line which is a patterned gate metal.

That is, the diffraction exposure process forms an opening in the pixel area part for a common electrode, and leaves the gate insulating layer 330 and the active layer 340 on the gate metal 320 to operate as a common signal line.

As shown in FIG. 3B, center portions of the source/drain electrode 350, the active layer 340, the gate insulating layer 330 and the gate metal 320, which are stacked on the gate pad part, are etched to open the common electrode 310 which may be the lowest layer in the gate pad part.

Figure 3C:
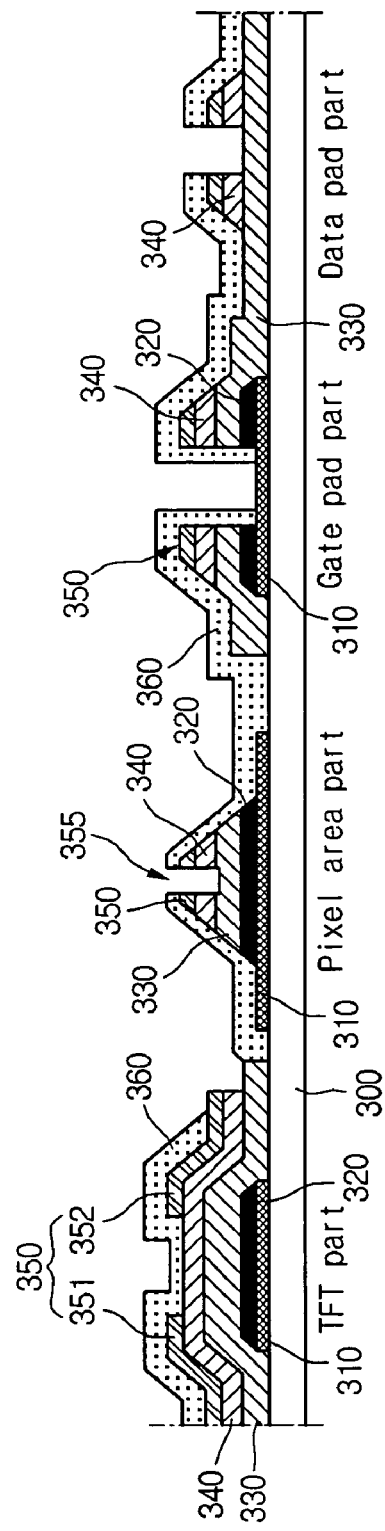

As shown in FIG. 3C, a passivation layer 360 is deposited substantially on the entire surface of the board 300. Then, a photolithography process is performed using a third mask shown in FIG. 4C to form a contact hole on the drain electrode 352 of the TFT part, to remove the active layer remaining at the center of the pixel area part and to open the gate pad part and the data pad part.

Figure 4C:
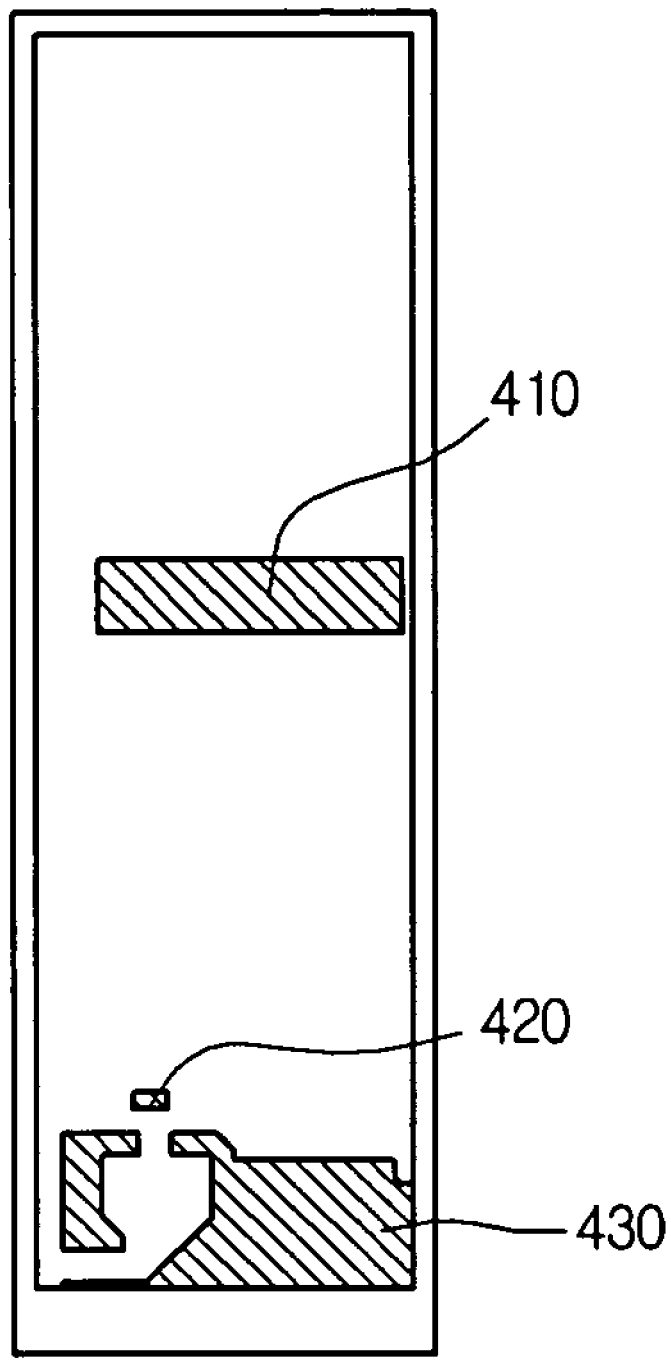
Figure 4D:
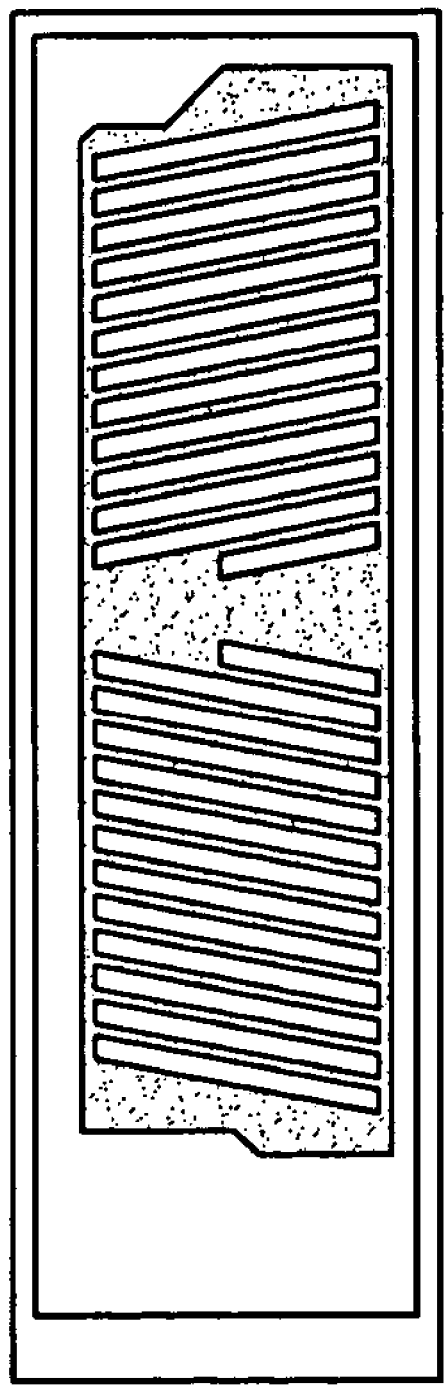

The third mask of FIG. 4C includes a first opening 410 for removing the active layer 340 of the pixel area part, a second opening 420 for forming the contact hole and a third opening 430 for removing the active layer overlapped with a gate metal and the source/drain electrode layer except the channel forming area of the TFT part.

Figure 3D:
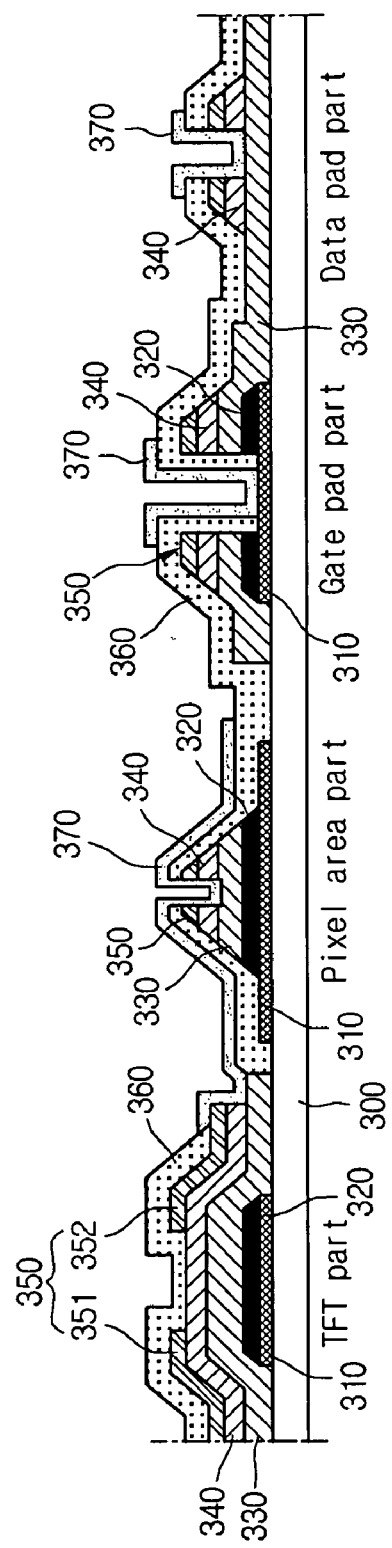

As shown in FIG. 3D, a pixel electrode 370 is deposited substantially on the entire surface of the board 300. Then, the predetermined regions of the pixel electrode 370 including a region contacting the drain electrode 352 of the TFT part, a region having the opening of the pixel area part and opened regions of the gate pad part and the data pad part are patterned through a photolithography process using a fourth mask shown in FIG. 4D.

As described above, four mask processes are performed in order to fabricate the FFS mode LCD according to the present embodiment. Also, the fabrication method according to the present embodiment minimizes sizes of areas for the diffraction exposure process while reducing the number of mask processes. Therefore, harmful effects which may result from diffraction exposure over large areas can be reduced.

FIGS. 5A through 5D are cross sectional views for describing a method of fabricating an FFS mode LCD according to another embodiment of the present invention, and FIGS. 6A through 6D show mask patterns used for the mask processes as illustrated in FIGS. 5A through 5D.

Figure 5A:
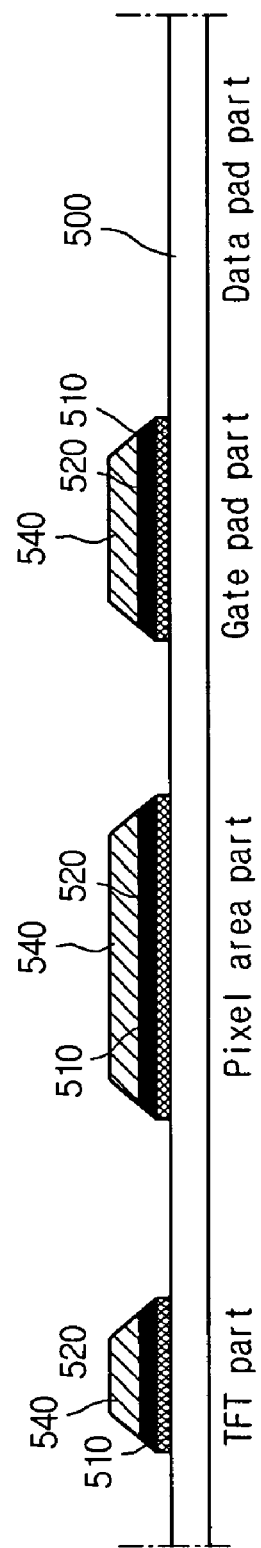
FIGS. 5A through 5D are cross sectional views for describing a method of fabricating an FFS mode LCD according to an embodiment of the present invention.
Figure 6A:
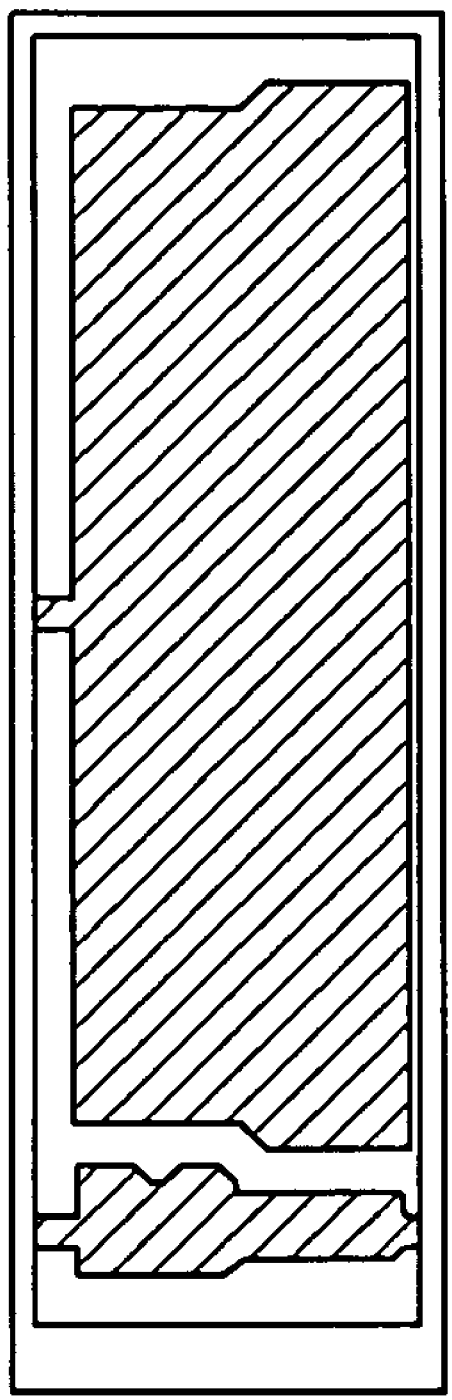
FIGS. 6A through 6D show mask patterns used for the mask processes illustrated in FIGS. 5A through 5D.

As shown in FIG. 5A, a common electrode 510, a gate metal 520, and a first gate insulating layer 530 (not shown in FIG. 5A) are sequentially deposited on a board 500. Then, the common electrode 510, the gate metal 520 and the gate insulating layer 530 are simultaneously etched through a photolithography process using a first mask having a pattern as illustrated in FIG. 6A.

As a result, the common electrode 510 and the gate metal 520 are substantially stacked on a TFT part, a pixel area part and a gate pad part.

The gate metal 520 formed on the TFT part operates as a gate line and a gate electrode, the gate metal 520 formed on the pixel area part operates as a common signal line, and the gate metal 520 formed on the gate pad part operates as a bottom electrode.

Figure 5B:
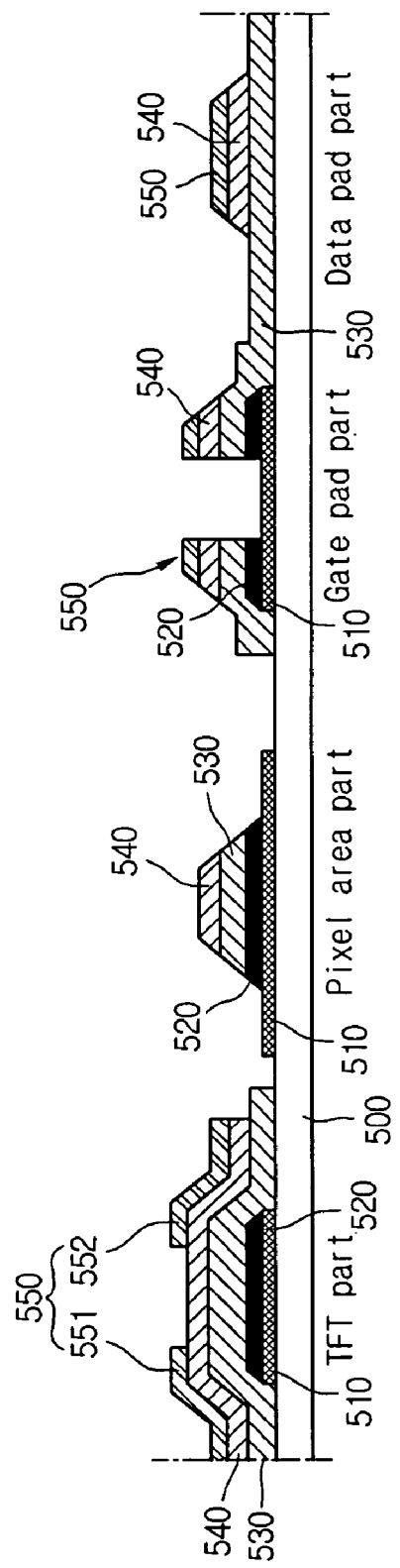
Figure 6B:
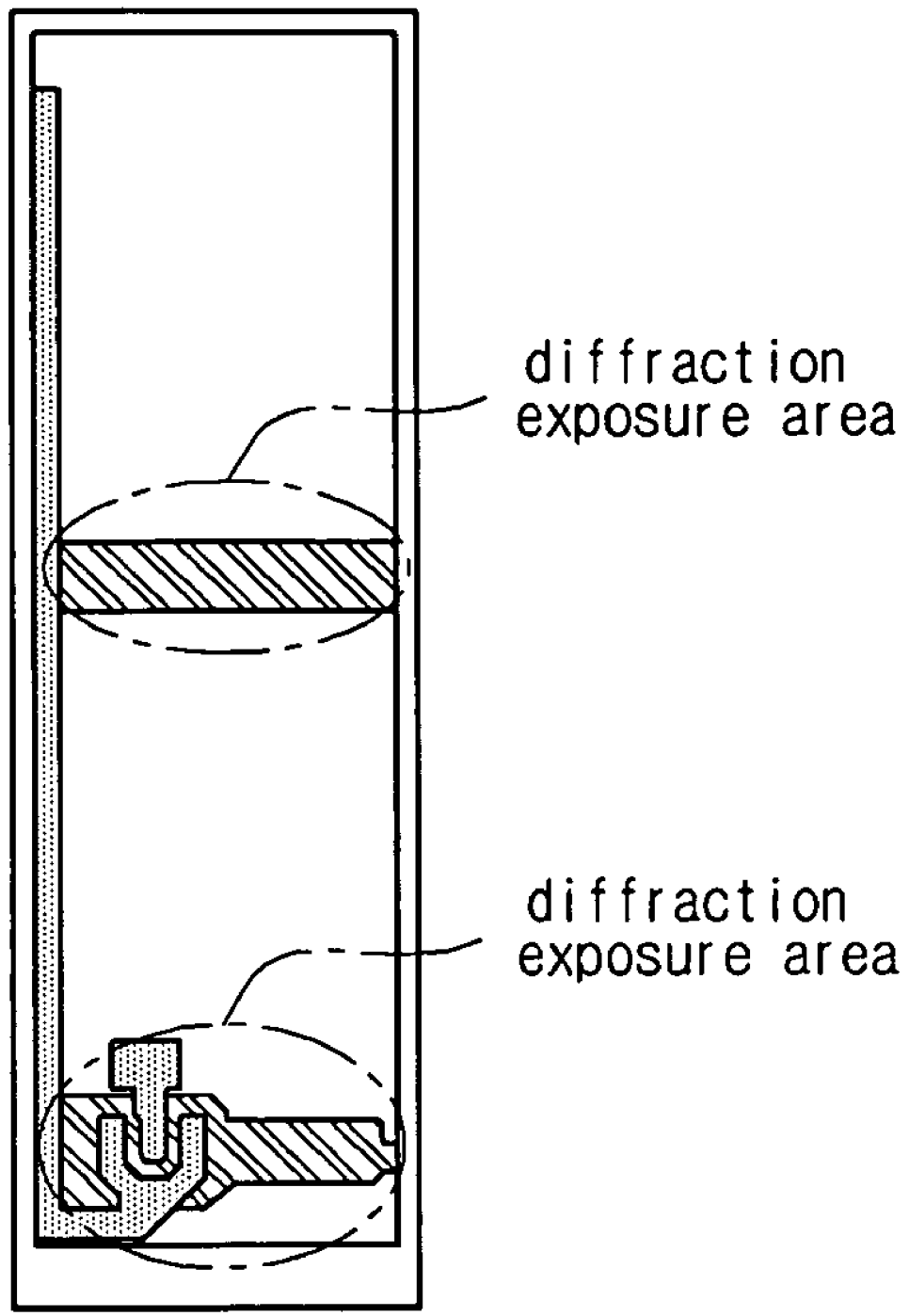
Figure 6C:
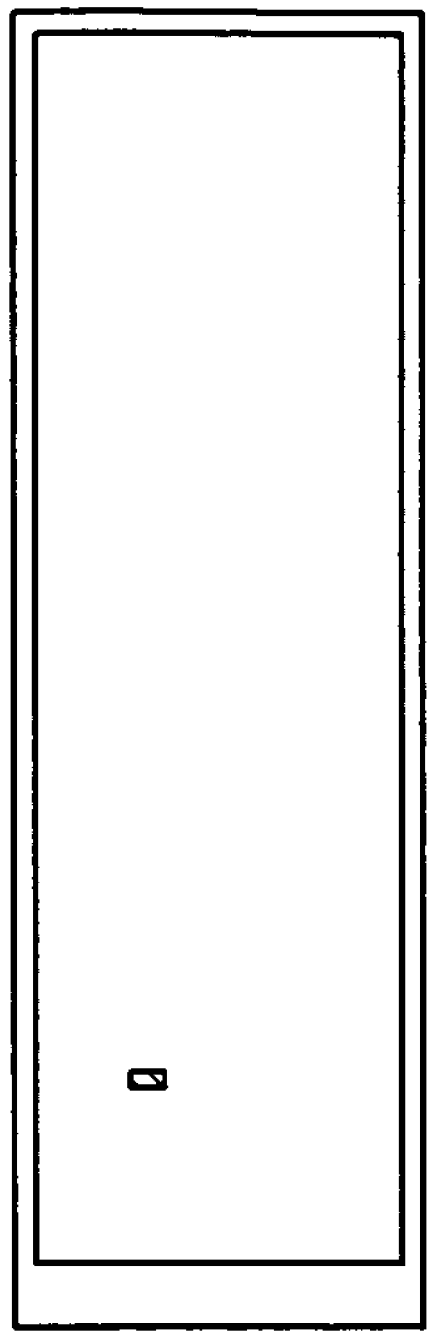
Figure 6D:
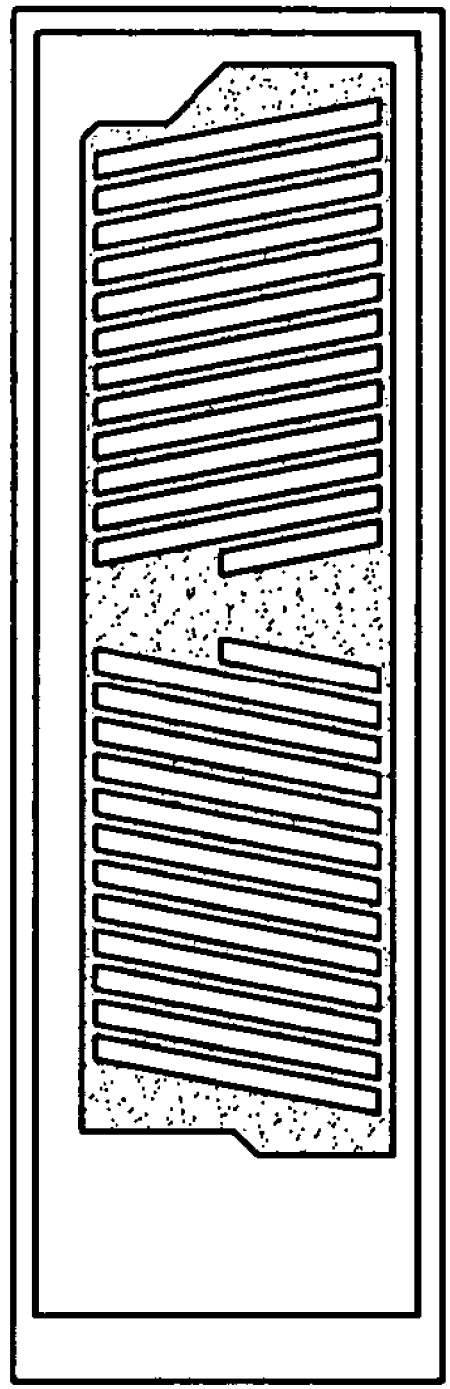

As shown in FIG. 5B, an active layer 540 and a source/drain metal 550 are sequentially deposited on the board 500. Then, a photolithography process is performed using a second mask as illustrated in FIG. 6B to form a channel on the TFT part, to remove the gate metal from an opened region of the pixel area part and to open the gate pate part.

Also, a second gate insulating layer (not shown), an active layer 540 and a source/drain metal 550 are sequentially stacked on the data pad part.

A diffraction exposure process is performed in the second mask process in the fabrication method according to the present embodiment as shown in FIG. 5B. The diffraction exposure process according to the present embodiment is performed on the channel forming area of the TFT part and the common signal line forming area of the pixel area part.

As shown in FIG. 5B, the diffraction exposure process exposes the active layer 540 and separates a source electrode 551 and a drain electrode 552 in the TFT part to form the channel in the TFT part. Also, the gate metal 520 substantially formed on the center portion of the pixel area part is not etched so the remaining gate metal 520 operates as a common signal line which is a patterned gate metal.

That is, an opening is formed to open a common electrode 510 in the pixel area part through the diffraction exposure process, the gate insulating layer remains on the gate metal 520 that operates as a common signal line, and the active layer 540 and the source/drain metal 550 remaining on the gate insulating layer 530 are removed.

As shown in FIG. 5B, center portions of the source/drain electrode 550, the active layer 540, the gate insulating layer 530 and the gate metal 520 are etched to expose a common electrode 510 which may be the lowest layer in the gate pad part.

Figure 5C:
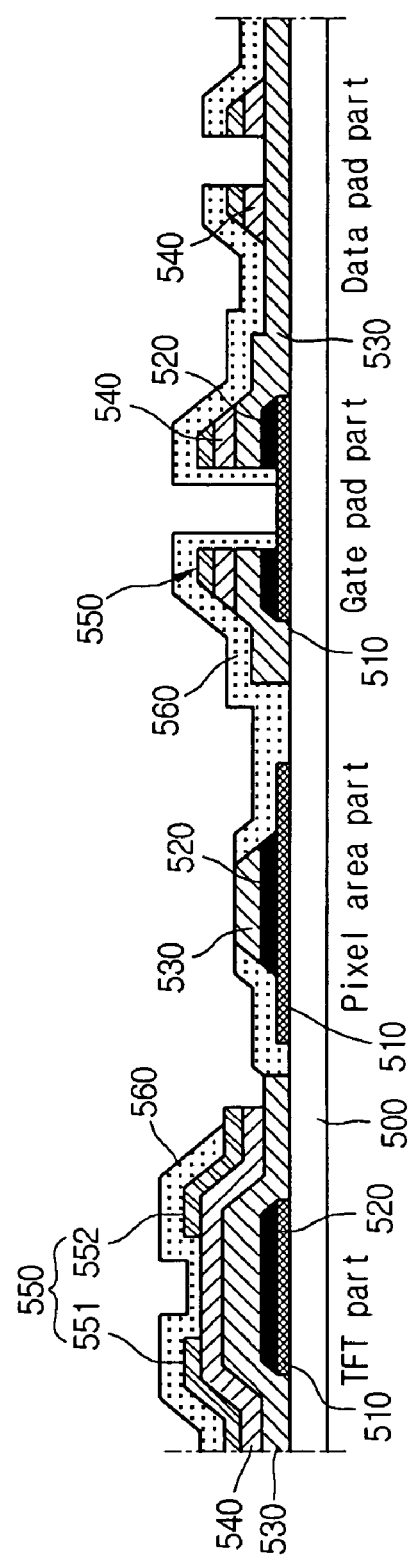
Figure 5D:
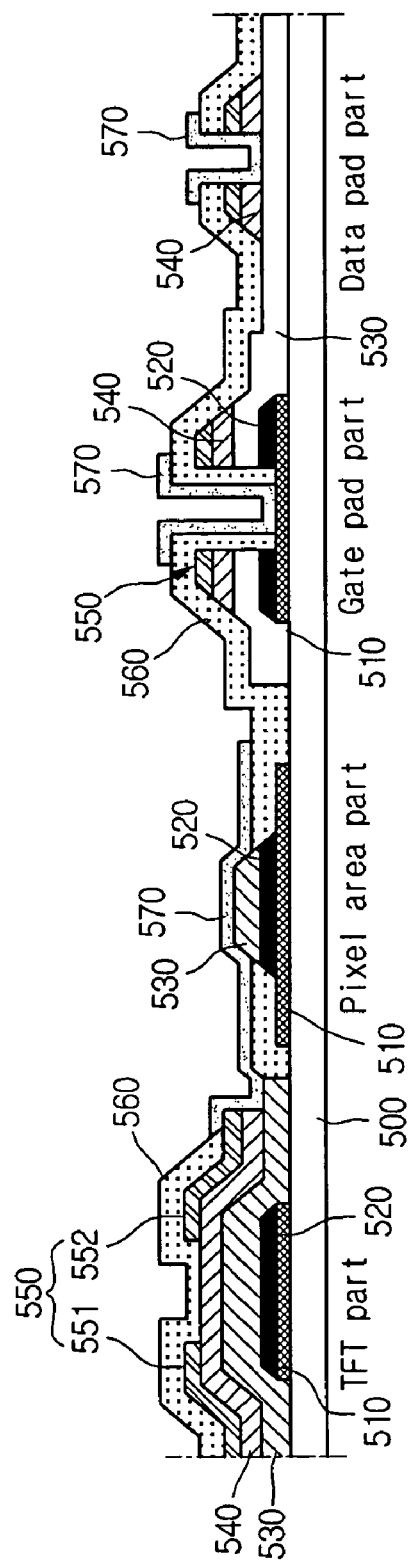

As shown in FIG. 5C, a passivation layer 560 is formed on substantially the entire surface of the board 500. Then, a photolithography process is performed using a third mask of FIG. 6C to form a contact hole on the drain electrode 552 of the TFT part and to open the gate pad part and the data pad part.

Finally, a pixel electrode 570 is deposited substantially on the entire surface of the board 500. Then, a pixel electrode 570 is formed on predetermined regions including a region contacting the drain electrode of the TFT part, a region having an opening of pixel area part, and opened regions of the gate pad part and the data pad part.

As described above, four mask processes are necessary to fabricate the FFS mode LCD according to an embodiment. Also, the fabrication method according to the embodiment minimizes sizes of areas for the diffraction exposure process while reducing the number of mask processes. Therefore, harmful effects which may result from diffraction exposure over large areas can be reduced.

As described above, the fabrication method according to the present invention has the advantage of reducing harmful effects resulting from diffraction exposure over large areas by minimizing sizes of areas for the diffraction exposure process while reducing the number of mask processes.

The fabrication method according to the present invention improves manufacturing productivity and yield for LCDs by reducing the number of mask processes.

While the mask configurations appear as shown in the Figures, it is to be understood that various other modifications and configurations are possible without departing from the spirit and scope of the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a fringe field switching mode liquid crystal display device comprising:
   forming a common electrode and a gate metal on a board in sequence;
   etching the common electrode and the gate metal at the same time through a first mask process;
   forming a gate insulating layer, an active layer and a source/drain metal on the board in sequence;
   forming a channel in a thin-film transistor (TFT) part, substantially removing a gate metal at an opened region of the pixel area part and substantially opening a gate pad part;
   forming a passivation layer substantially on the entire surface of the board, and forming a contact hole on a drain electrode of the TFT part, removing an active layer remaining at the center of the pixel area part and exposing a gate pad part and a data pad part by performing a third mask process; and
   forming a pixel electrode on a predetermined region contacting the drain electrode in the TFT part, a predetermined region having the opening in the pixel area part and opened regions of the gate pad part and the data pad part through a fourth mask process.

2. The method according to claim 1, wherein a gate metal formed on the TFT part operates as a gate line and a gate electrode, a gate metal formed on the pixel area part operates as a common signal line and a gate metal of the gate pad part operates as a bottom electrode of a gate pad.

3. The method according to claim 1, wherein a diffraction exposure is performed in the second mask process and the diffraction exposure is performed on a channel forming area in the TFT part and a common signal line forming area in the pixel area part.

4. The method according to claim 3, wherein the diffraction exposure exposes an active layer in the TFT part and forms a channel by separating the source electrode and the drain electrode.

5. The method according to claim 3, wherein the diffraction exposure forms an opening that exposes a common electrode in the pixel area part, and a gate insulating layer and an active layer on a gate metal that operates as a common signal line remain.

6. The method according to claim 1, wherein a mask pattern used for the third mask process comprises a first opened portion for removing an active layer of a pixel area part, a second opened portion for forming the contact hole, and a third opened portion for removing the active layer overlapped with a gate metal and a source/drain electrode layer except a TFT channel area.

7. A method of fabricating a fringe field switching (FFS) mode liquid crystal display device, comprising:
   forming a common electrode, a gate metal and a gate insulating layer on a board in sequence;
   etching the common electrode, the gate metal and the gate insulating layer through a first mask process;
   forming an active layer and a source/drain metal on the board in sequence;
   forming a channel in a thin-film transistor (TFT) part, removing a gate metal at an opened region of the pixel area part, and opening a gate pad part;
   forming a passivation layer substantially on the board, forming a contact hole on a drain electrode of the TFT part, removing an active layer remaining substantially at the center of the pixel area part and opening a gate pad part and a data pad part by performing a third mask process; and
   forming a pixel electrode at a predetermined region of the TFT part that contacts a drain electrode of the TFT part, a predetermined region of the pixel area part having an opening of the pixel area part and openings of the gate pad part and the data pad part by performing a fourth mask process.

8. The method according to claim 7, wherein a portion of the gate metal formed on the TFT part operates as a gate line and a gate electrode, a portion of the gate metal formed on the pixel area part operates as a common signal line and a portion of the gate metal of the gate pad part operates as a bottom electrode of a gate pad.

9. The method according to claim 7, wherein a diffraction exposure is performed in the second mask process and the diffraction exposure is performed on a channel forming area in the TFT part and a common signal line forming area in the pixel area part.

10. The method according to claim 9, wherein the diffraction exposure exposes an active layer in the TFT part and forms a channel by separating the source electrode and the drain electrode.

11. The method according to claim 9, wherein the diffraction exposure forms an opening that exposes a common electrode in the pixel area part, and a gate insulating layer above the gate metal that operates as a common signal line remains.

12. A method of fabricating a fringe field switching (FFS) mode liquid crystal display device, the method comprising:
    forming a common electrode, a gate metal and a first insulating layer on a board in sequence;
    etching the common electrode, the gate metal and the gate insulating layer through a first mask process;
    forming a second gate insulting layer, an active layer and a source/drain metal on the board in sequence;
    forming a channel in a thin-film transistor (TFT) part, substantially removing a portion of the gate metal at an opening of the pixel area part, and opening a gate pad part;
    forming a passivation layer substantially on the board, forming a contact hole on a drain electrode of the TFT part, removing an active layer remaining at the center of the pixel area part and opening a gate pad part and a data pad part by performing a third mask process; and
    forming a pixel electrode at a predetermined region of the TFT part that contacts a drain electrode of the TFT part, a predetermined region of the pixel area part having an opening of the pixel area part and opened regions of the gate pad part and the data pad part by performing a fourth mask process.

* * * * *